Patented July 29, 1952

2,605,261

UNITED STATES PATENT OFFICE 2,605,261

METHOD FOR SEPARATING LACTAMS

Kurt Kahr, Ems, Switzerland, assignor to Inventa A.-G. für Forschung und Patentverwertung Luzern, Luzern, Switzerland No Drawing. Application January 18, 1950, Serial No. 139,320. In the Netherlands January 29, 1949

1 Claim. (Cl. 260—239.3)

The preparation of lactams by Beckmann's rearrangement of cyclic oximes is well known in the art. This reaction is performed in the presence of strong acids, preferably anhydrous sulfuric acid or oleum, and uses approximately equal parts by weight of oxime and acid at temperatures of approximately 80 to 130° C. In order to isolate the lactams from this mixture of rearrangement, the acid is neutralised preferably in aqueous solution. The lactams are soluble in water, but are almost completely separated in concentrated solutions of neutral salts. It is, therefore, desirable to use the neutralising agent together with only such an amount of water that, after neutralisation, a saturated salt solution is obtained. The lactams thus separate in form of a water-containing oily layer, and only a small amount which can be recovered with organic solvents, remains dissolved in the salt solution. The pure lactams are obtained by distillation of the water-containing products.

The neutralisation has hitherto been conducted by allowing the mixture of rearrangement to flow in ice-water and neutralising the diluted sulfuric acid in the cold, or by adding the mixture of arrangement in the cold and with good stirring to an aqueous solution of the neutralising agent until the acid was neutralised. In both cases a loss of lactam may easily occur due to the fact that the said substances are readily decomposed in strongly acid solutions as well as in alkaline solutions. This decomposition is especially remarkable at elevated temperatures and with prolongated neutralisation times. Both methods, therefore, require not only good cooling but also the maintenance of low temperatures such as can only be obtained by the use of cooling brines. It may be more convenient to perform the neutralisation in a continuous manner, i. e. to react the aqueous neutralising agent and the mixture of rearrangement in a neutral medium by feeding both components into the reacted aqueous neutralising mixture while cooling and stirring well. As the rearrangement mixture is very viscous, it does not at once distribute itself throughout the aqueous neutralisation mixture, but forms local zones which are strongly acid and over-heated and wherein decomposition of the lactam may occur. In the last mentioned neutralisation process, the amount of lactam in the neutralisation mixture is proportionally high so that the influence of the lactam decomposition is especially remarkable and the losses of lactams are considerable.

I have now found that it is possible to obtain the lactams with considerable excellent yields if the continuous preparation thereof is performed in such manner that the neutral salt solution which is obtained and separated in the neutralisation process, is recycled or fed back into the space in which occurs neutralisation of the products obtained by the rearrangement of cyclic oximes with the aid of strong sulfuric acid or oleum. The amount of the salt solution fed back should be at least equal to or a multiple of the aqueous neutralising medium employed in a like time interval.

To this end, the salt solution obtained in the neutralisation process, after having been thoroughly freed from its lactam content, is fed into the aqueous neutralisation medium in the zone of neutralisation or immediately before said zone, whereupon said mixture and the lactam-containing rearrangement product are interacted in as fine a dispersion as possible. The neutralised mixture thereby may flow off from the neutralisation zone while still hot, without impairing the yield of lactam. Cooling need not be effected with cooling brine, since mere cooling water is sufficient. It is advantageous to use the salt solution which has been thoroughly freed from its lactam content, in a precooled state for diluting the neutralisation components. The fine dispersion and intimate mixture of the components may be attained by vigourously stirring in a small space or by bringing together the liquid components in a finely distributed state and at high speed, for example by means of nozzles or mixers.

By the provision of a small neutralisation space wherein fresh mixture, coming from the rearrangement process, is brought in contact with the neutralisation mixture, and due to the small portion of lactam in the neutralisation mixture, the decomposition of the lactams is prevented in a substantial degree. The time during which the reactants stay in the zone of neutralisation should be shortened as much as possible. The higher the temperature of neutralisation, which may be raised up to the boiling point of the mixture, the shorter should be this time, i. e. the faster the separated crude lactam should be removed from the space of reaction. Generally the time during which the reactants remain in said space, should not exceed 3 to 10 minutes.

The neutralising agents are preferably such alkaline substances as together with sulfuric acid will give salts which are readily soluble in water, that is to say, which are liable to form highly-concentrated solutions. It should be avoided as much as possible that these salts precipitate during neutralisation; as otherwise the lactams will take up small amounts thereof which can only be separated therefrom with difficulty. It is preferred to work with concentrations such that the salt solutions formed will become nearly or totally saturated. The preferred neutralising agent is ammonia, due to the fact that the solubility of ammonium sulfate in water is considerable and concentrations exceeding 40% are obtainable. In order to obtain a nearly saturated solution of ammonium sulfate, I preferably use an aqueous ammonia solution containing 13 to 15% of ammonia. In the same manner, the neutralisation may be performed with sodium or potassium hydroxide solutions having a hydroxide content of 20 to 25%. In this case a saturated solution of sodium or potassium sulfate originating from the same neutralisation, is fed back into the space of neutralisation.

The pH value of the neutralisation mixture should be kept in the range between 3 and 8, preferably at an average value of about 6.

The mixture flowing away from the neutralisation zone may be separated, before or after cooling, into the oily crude lactam, and an approximately or completely saturated sulfate solution. From the crude lactam a pure lactam is obtained by vacuum distillation, in a yield of approximately 93% calculated on the lactam content of the rearrangement mixture.

The process described in the foregoing specification is especially well suited for the separation of lactams obtained from cyclic oximes having 6 and more carbon atoms in their ring. The lactams obtained from oximes with 6 to 11 carbon atoms, are preferred. Examples for such lactams and the related oximes are caprolactam and cyclohexanone oxime, oenantholactam and suberone oxime, $\omega$-aminooctylic acid lactam and cyclooctanone oxime $\omega$-aminononylic acid lactam and cyclononanone oxime, $\omega$-amino-decylic acid lactam and cyclodecanone oxime, $\omega$-amino-undecylic acid lactam and cycloundecanone oxime.

The parts indicated in the following examples are parts by volume.

Example 1

18.6 parts of a product obtained by the reaction of cyclohexanone oxime with oleum and 40 parts of a 14.5% aqueous ammonia solution and 80 parts of a saturated ammonium sulfate solution, derived from the neutralisation process, are allowed to flow per hour into a vessel which is provided with a stirrer and is externally cooled and has a volume equivalent to 5 parts, but is reduced by means of a syphon over-flow to an effective volume equivalent to 2.5 parts. The neutralisation product flows through the over-flow into a separating vessel at a temperature of 75° C. and with a pH value of 6. From the separating vessel 15.8 parts of the crude lactam (specific gravity 1.07 at 20° C.) and ammonium sulphate solution (specific gravity 1.241 at 20° C.) are drawn off per hour. The sulphate solution is extracted with an organic solvent and the whole of the crude lactam is distilled in vacuo. Pure caprolactam is obtained in a yield of 92.5%.

Example 2

19 parts of the mixture obtained by treating cyclohexanone oxime with oleum, having a temperature of about 50° C., and a mixture of 40 parts of 14.5% aqueous ammonia having a temperature of 20° C. with 40 parts of a saturated ammonium sulfate solution coming from the neutralisation process and having a temperature of 30° C., flow continuously together per hour in an "Orifix-Mixer." The neutralisation product flows into a separating vessel at a temperature of 80° C. and a pH 7, from which crude lactam is drawn off at an hourly rate of 16 parts. By vacuum distillation the pure caprolactam is obtained in a 93% yield. The separated ammonium sulfate solution is partly fed back to neutralisation.

Example 3

48 parts of the rearrangement product obtained from suberon oxime with oleum, 100 parts of aqueous ammonia solution (15%) and 100 parts of the ammonium sulfate solution fed back from the neutralisation are mixed intimately in the manner described in Example 2. The mixture which flows into a separating vessel, has a temperature of 90° C. and a pH of 6.5. From said vessel, crude lactam is drawn off at an hourly rate of 41 parts, with a specific gravity of 1.065 at 20° C. The crude lactam is distilled in vacuo, and the pure oenantholactam is obtained in a yield of 90%.

What I claim is:

In a process for separating lactams from the mixture obtained by Bechmann's rearrangement of cyclic oximes with strong sulphuric acid, the steps of continuously delivering into a neutralizing vessel the rearrangement mixture and a neutralizing agent in aqueous solution and of the type to form with the sulphuric acid a water soluble salt, continuously drawing off the resulting neutralized mixture from said neutralizing vessel at a rate to maintain a substantially constant amount of liquid in said neutralizing vessel, said neutralizing agent being delivered to said vessel in amounts only sufficient to neutralize substantially the acid in the rearrangement mixture in said vessel and to maintain thereby the pH of the neutralized mixture drawn off from said vessel at an average value of about 6, separating in the drawn off neutralized mixture the lactam from the neutral salt solution produced by the reaction of the neutralizing agent and the sulphuric acid, and continuously returning to said neutralizing vessel the separated neutral salt solution in amount to maintain the solution drawn off from said vessel substantially saturated with the neutral salt.

KURT KAHR.

REFERENCES CITED

The following references are of record in the file of this patent:

UNITED STATES PATENTS

| Number | Name | Date |
| --- | --- | --- |
| 2,221,369 | Cass | Nov. 12, 1940 |
| 2,297,520 | Wiest et al. | Sept. 29, 1942 |
| 2,313,026 | Schlack | Mar. 2, 1943 |

OTHER REFERENCES

Boundy et al.: CIDS Target No. 22/517, Item No. 22, file No. XXVI-53 (530), Manufacture of Caprolactam, 6 pages.